United States Patent
Grgac et al.

(10) Patent No.: US 10,252,471 B2
(45) Date of Patent: Apr. 9, 2019

(54) RESISTIVE IMPLANT WELDING CARBON FIBER THERMOPLASTICS USING HIGHLY CONDUCTIVE MESH

(71) Applicants: MAGNA INTERNATIONAL INC., Aurora (CA); Steven Grgac, Mississauga (CA); Ahmed Elagha, London (CA)

(72) Inventors: Steven Grgac, Mississauga (CA); Ahmed Elagha, London (CA)

(73) Assignee: Magna Exteriors Inc., Concord (CA)

( * ) Notice: Subject to any disclaimer, the term of this patent is extended or adjusted under 35 U.S.C. 154(b) by 150 days.

(21) Appl. No.: 15/129,930

(22) PCT Filed: Apr. 6, 2015

(86) PCT No.: PCT/IB2015/052485
§ 371 (c)(1),
(2) Date: Sep. 28, 2016

(87) PCT Pub. No.: WO2015/155669
PCT Pub. Date: Oct. 15, 2015

(65) Prior Publication Data
US 2017/0173860 A1 Jun. 22, 2017

Related U.S. Application Data

(60) Provisional application No. 61/978,042, filed on Apr. 10, 2014.

(51) Int. Cl.
*B29C 65/34* (2006.01)
*B29L 31/30* (2006.01)
(Continued)

(52) U.S. Cl.
CPC .......... *B29C 65/5057* (2013.01); *B23K 11/16* (2013.01); *B29C 65/344* (2013.01);
(Continued)

(58) Field of Classification Search
CPC ... B29C 65/34; B29C 65/2404; B29C 65/344; B29C 65/3472; B29C 65/3476;
(Continued)

(56) References Cited

U.S. PATENT DOCUMENTS

2003/0003317 A1* 1/2003 Chang ................ B32B 15/08
428/558
2003/0155066 A1 8/2003 Roehr
(Continued)

FOREIGN PATENT DOCUMENTS

| WO | 2009088720 A1 | 7/2009 |
| WO | 2011106085 A1 | 9/2011 |
| WO | 2012109541 A1 | 8/2012 |

OTHER PUBLICATIONS

International Search Report for International Application No., PCT/IB2015/052485 dated Jul. 8, 2015.

*Primary Examiner* — Carson Gross
(74) *Attorney, Agent, or Firm* — Warn Partners, P.C.

(57) ABSTRACT

A method of resistive implant welding carbon fiber thermoplastic composites which includes providing at least two portions of a component formed with carbon fiber material, the at least two portions of the component each have a welding surface where the at least two portions of the component are welded together. One or more conductors of copper or aluminum mesh material positioned between the welding surface of the two portions. The method includes a forming tool having at least two portions capable of moving between an open position and a closed position. The forming tool has a welding region with non-conductive metal surface areas where electric current is selectively applied to facilitate the welding together of the at least two portions of the component. The forming tool has forming regions with conductive surfaces where the two components are shaped.

20 Claims, 15 Drawing Sheets

(51) Int. Cl.
  *B29C 65/50* (2006.01)
  *B23K 11/16* (2006.01)
  *B29C 65/72* (2006.01)
  *B29C 65/00* (2006.01)

(52) U.S. Cl.
  CPC ...... *B29C 65/3468* (2013.01); *B29C 65/3476* (2013.01); *B29C 65/72* (2013.01); *B29C 66/112* (2013.01); *B29C 66/131* (2013.01); *B29C 66/1312* (2013.01); *B29C 66/30341* (2013.01); *B29C 66/53461* (2013.01); *B29C 66/54* (2013.01); *B29C 66/547* (2013.01); *B29C 66/61* (2013.01); *B29C 66/721* (2013.01); *B29C 66/7212* (2013.01); *B29C 66/72143* (2013.01); *B29C 66/73921* (2013.01); *B29C 66/8161* (2013.01); *B29C 66/81831* (2013.01); *B29C 66/81871* (2013.01); *B29C 66/8322* (2013.01); *B29C 66/71* (2013.01); *B29L 2031/3044* (2013.01)

(58) Field of Classification Search
  CPC .............. B29C 66/721; B29C 66/7212; B29C 66/73921; B29C 66/8182; B29C 66/81821; B29C 66/81825; B29C 66/8183; B29C 66/81831; B29C 66/8187; B29C 66/81871; B29C 66/81875; B29C 66/8188; B29C 66/81881; B29C 66/81885; B60R 19/02; B29L 2031/3005; B29L 2031/3008; B29L 2031/304
  See application file for complete search history.

(56) References Cited

U.S. PATENT DOCUMENTS

| | | | |
|---|---|---|---|
| 2008/0152919 A1* | 6/2008 | Grgac | B29C 65/344 428/411.1 |
| 2011/0212331 A1* | 9/2011 | Dyke | B29C 65/342 428/414 |
| 2013/0307281 A1* | 11/2013 | Birka | B60R 19/03 293/120 |
| 2016/0052565 A1* | 2/2016 | Shi | B29C 70/08 428/36.4 |

* cited by examiner

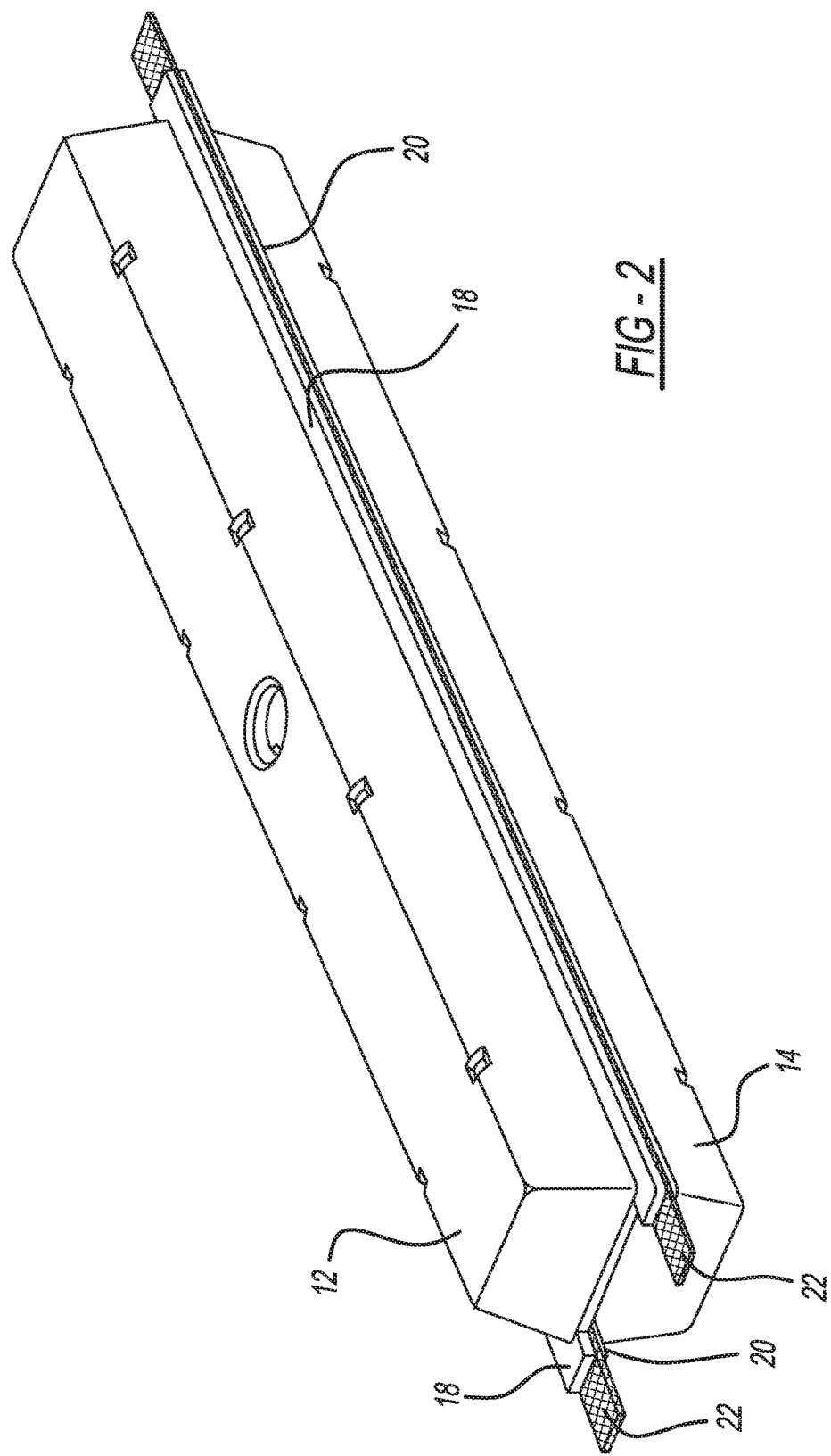

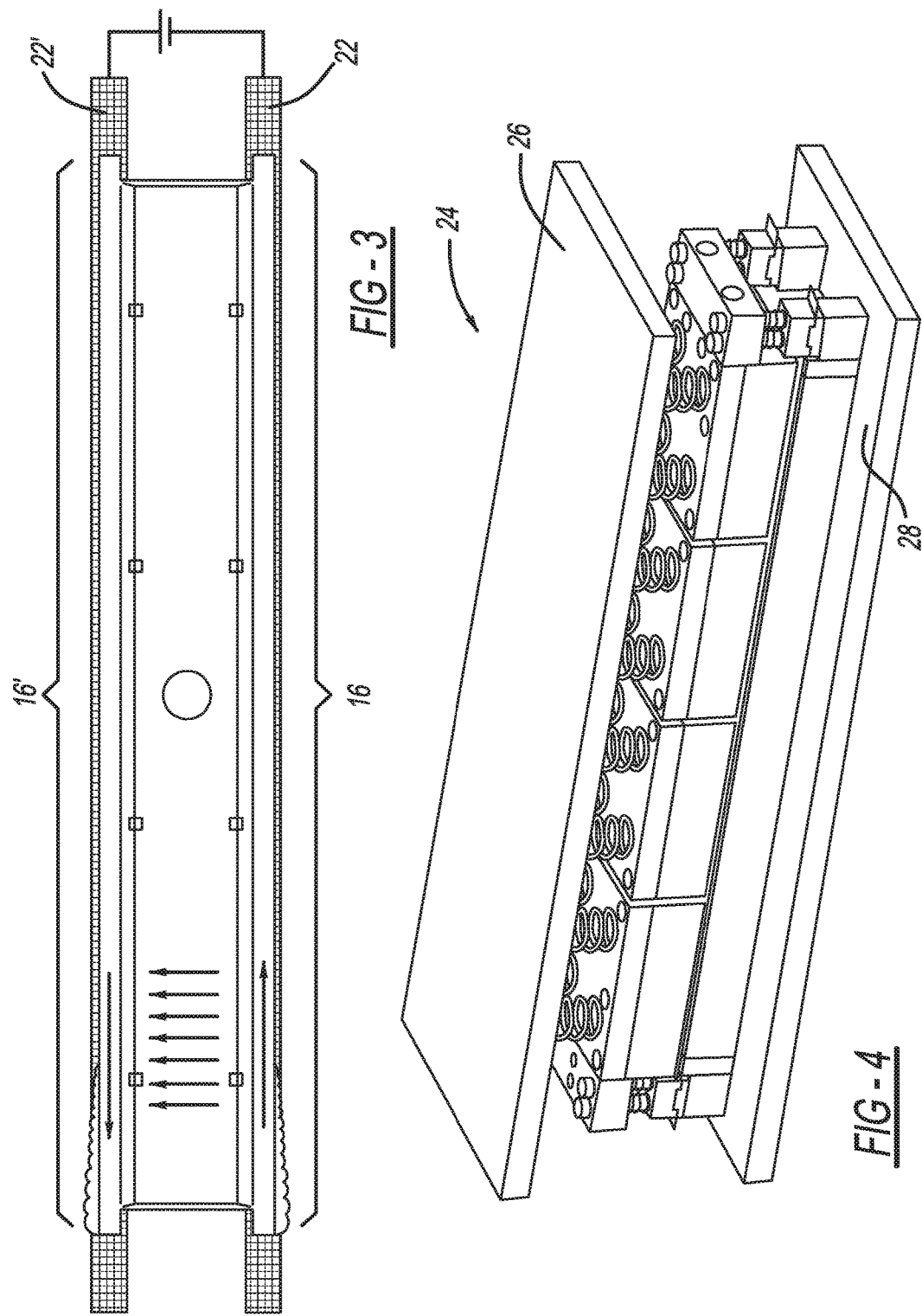

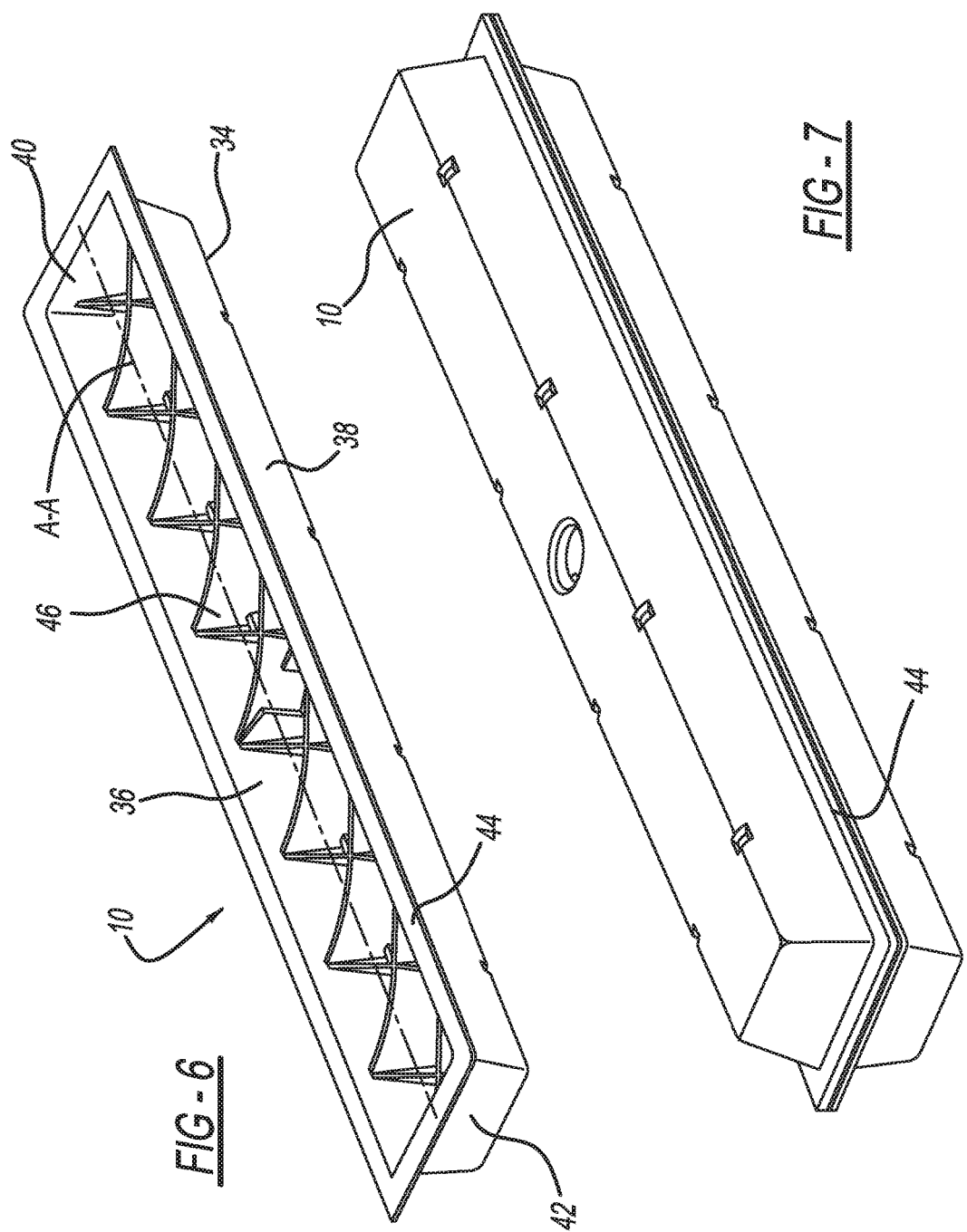

RESISTIVE IMPLANT WELDING CARBON FIBER THERMOPLASTICS USING HIGHLY CONDUCTIVE MESH

This application is a National Stage of International Application No. PCT/IB2015/052485, filed Apr. 6, 2015. This application claims priority to Provisional Patent Application No. 61/978,042 filed on Apr. 10, 2014. The disclosure(s) of the above application(s) is (are) incorporated herein by reference.

FIELD OF THE INVENTION

The present invention relates to resistive implant welding using highly conductive mesh.

BACKGROUND OF THE INVENTION

Resistive implant welding carbon fiber filled thermoplastic composite components for automotive applications has created challenges due to the conductivity of the carbon fiber fillers, particularly when using conventional stainless steel wire mesh as a conductor. When electrical current is applied to stainless steel wire mesh conductors used in resistive implant welding, it takes the path of least resistance. Since carbon fibers used as filler in thermoplastic components are conductive, current initially travels through wire mesh but then redirects through the carbon fiber component and into the forming tool or fixturing. This results in poor, non-homogenous welds, particularly for parts having great length. Certain resistive implant welding techniques have attempted to resolve the current migration problem by using a ceramic spray coated stainless steel wire mesh to insulate the conductive part from the wire mesh, while still allowing heat to transfer through the ceramic coating. However, attempts to use the ceramic spray coating process with carbon fiber filled components have not resolved the current migration issues. There is a need to improve the current flow along the weld line in order to prevent current from crossing through the component. There is further a need to prevent current from flowing into the formation tool.

SUMMARY OF THE INVENTION

A method of resistive implant welding carbon fiber thermoplastic composites. The method includes providing at least two portions of a component formed with carbon fiber material, the at least two portions of the component each have a welding surface where the at least two portions of the component are welded together. One or more conductors of copper or aluminum mesh material positioned between the welding surface of the two portions. The method further includes a forming tool having at least two portions capable of moving between an open position and a closed position. The forming tool has a welding region with non-conductive metal surface areas where electric current is selectively applied to facilitate the welding together of the at least two portions of the component. The forming tool also has forming regions with conductive surfaces where the two components are shaped. The method includes opening the forming tool and loading the at least two portions within the forming tool with the one or more conductors positioned at the welding surface between the two components. Next the forming tool is closed and pressure is applied to shape the at least to components in the forming regions of the forming tool. An electric current is also applied to the one or more conductors causing the conductors to heat up and melt the at least to portions of the component together, along the non-conductive metal surface areas of the forming tool. The step of applying electric current occurs during the step of closing the forming tool and pressure from the forming tool is also applied to the non-conductive metal surface areas of the forming tool. After the weld has been formed the electric current is disconnected from the one or more conductors. In a last step the formation tool is opened and the component is removed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a perspective view of a structural component in accordance with one embodiment of the present invention;

FIG. 3 is a schematic overhead plan view of the structural component in accordance with one embodiment of the invention;

FIG. 4 is a schematic side perspective view of a forming tool with the structural component contained therein, where the forming tool is in the open position;

FIG. 6 shows a structural part according to the invention in perspective representation in a half-open tub-like embodiment;

FIG. 7, an additional exemplary embodiment of a structural part in perspective representation with an elongated closed structure of synthetic material;

DETAILED DESCRIPTION OF THE PREFERRED EMBODIMENTS

The following description of the preferred embodiment(s) is merely exemplary in nature and is in no way intended to limit the invention, its application, or uses.

Figure 1:
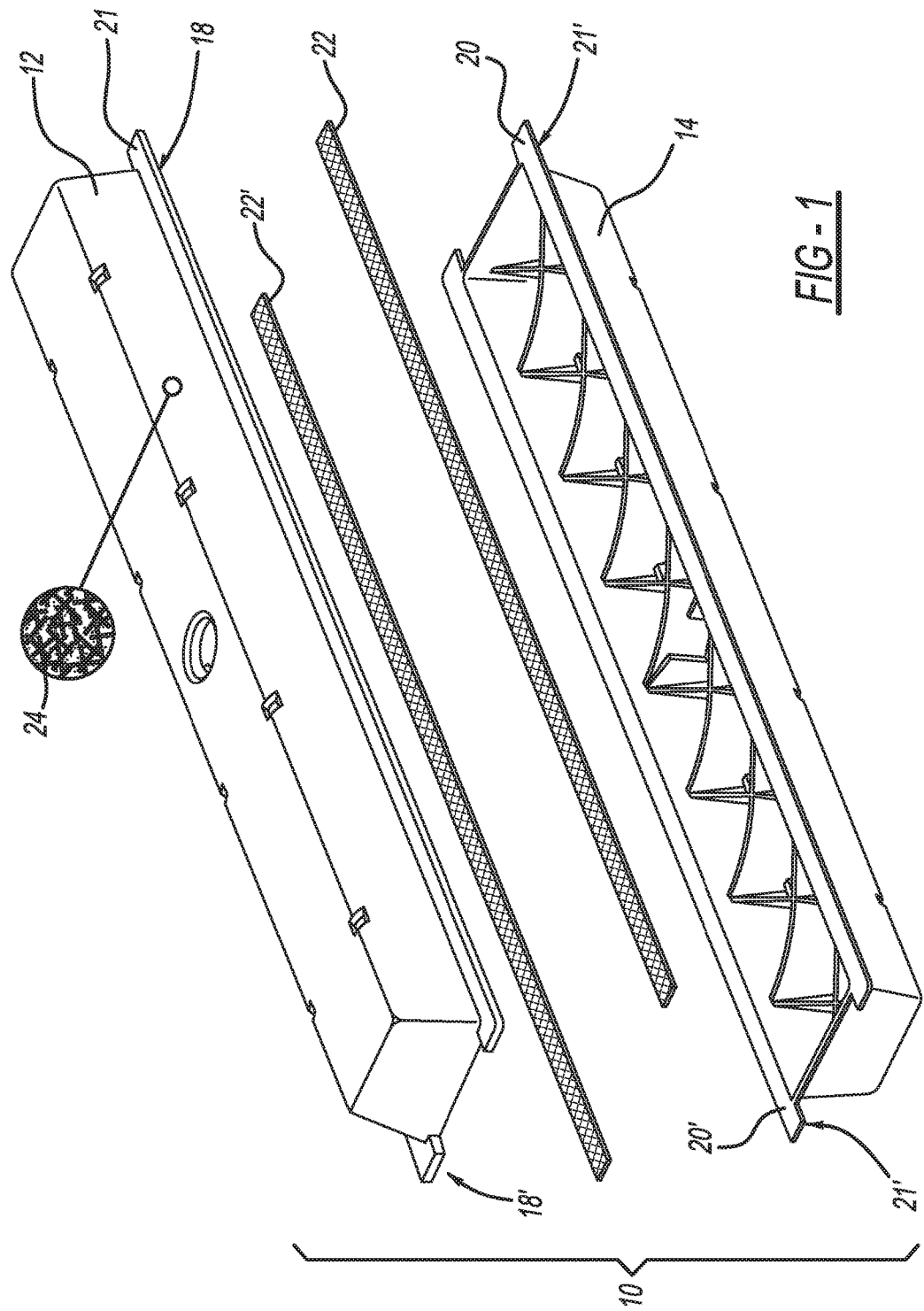
FIG. 1 is an expanded view of a structural component in accordance with one embodiment of the invention.

Referring now to FIGS. 1-3 of the application, a component 10 formed of two parts is shown. In the particular embodiment of the invention, the component 10 is a structural support member for use in an instrument panel the structure of which is described in greater detail below. It is also within the scope of this invention for the component form to be any type of vehicle component, including a carbon fiber reinforced tailgate and bumper assembly as discussed in the figures below. However the method of this invention may also be used to form other vehicle components including running boards, roof rack rails, lift gates or virtually any other type of vehicle component where two or more sections are joined together. However, it is within the scope of this invention for other components to be formed using the resistive implant welding process described herein. Such components include automotive components including front end carriers, bumper supports, tailgates, lift gates, running boards, roof racks, etc. In the present embodiment of the invention, the at least two portions, forming a top half 12 and bottom half 14, of the component have a welding surface 16 where the two portions of the component are welded together. The welding surface 16 in this particular embodiment of the invention is a flat flange 18 on the top half 12 and a flat flange 20 on the bottom half 14. The top half 12 and the bottom half 14 of the component 10 are placed adjacent each other in a flange to flange arrangement.

Positioned in the welding surface 16, between the flat flanges 18, 20 of the component 10 is a conductor 22 made of mesh material. In the present embodiment of the invention, the conductor 22 made of highly conductive material such as copper or aluminum mesh material. The component 10 itself is formed of a polymer material having carbon fiber fillers 24, which are conductive. Previous attempts to resistive implant weld polymer material with carbon fiber fillers 24 involved using stainless steel mesh which is not as highly conductive as the copper or aluminum mesh material. When electrical current flows through the mesh, it follows the path of least resistance; therefore, when copper or aluminum mesh material is used, the electric current flows through the material very evenly because that is the path of least resistance for the electrical current. When stainless steel mesh was used, it was noticed that some of the electric current would migrate through the carbon fibers of the part and the end result was that the weld between the two components was uneven and not desirable. When the copper or aluminum mesh is used in the welding surface area 16 between the top half 21 and bottom half 14 of the component 10, electrical current flows through the copper or aluminum mesh material causing the copper or aluminum mesh material to heat up and melt the polymer material of the two flat flanges 18, 20 to thereby weld the top half 12 and bottom half 14 together. This is accomplished by using a forming tool 24.

Figure 5:
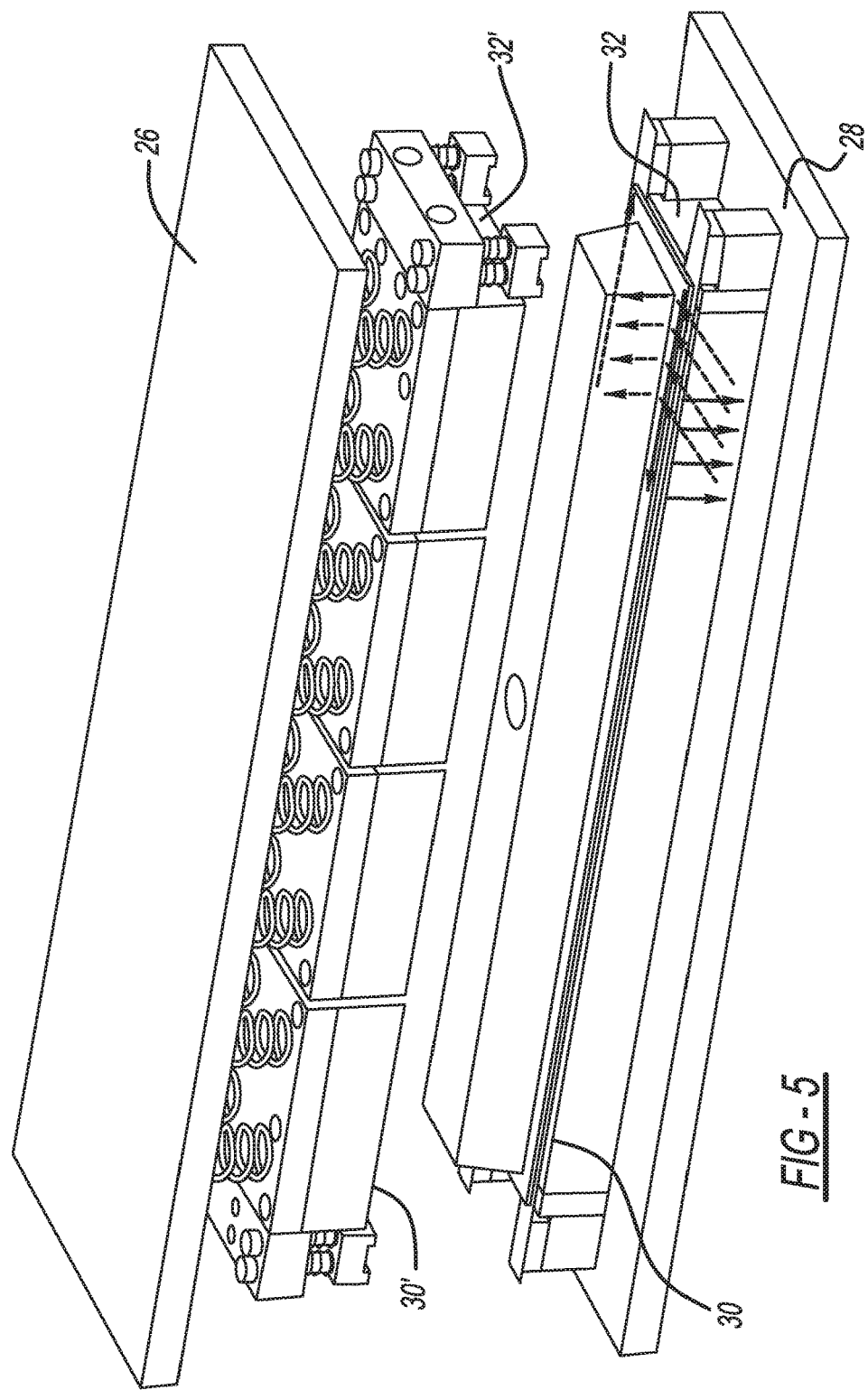
FIG. 5 is a schematic side perspective view of a forming tool with the structural component contained therein, where the forming tool is in the closed position.

FIGS. 4 and 5 show a forming tool 24 that has at least two portions capable of moving between an open position and a closed position. In FIGS. 4 and 5, the forming tool 24 has a top portion 26 and a bottom portion 28. While a top and bottom are shown, it is within the scope of the invention for there to be a left side, right side, or any orientation depending on the need of a particular application. The forming tool 24 has a welding region that has non-conductive metal surface areas 30, 30' that are configured to contact an outside surface 21, 21' of the welding surface or flange 16, 16' of the two portions of the component 10. The forming tool 24 also has forming regions that contain conductive surfaces 32, 32' that are used to shape the at least two portions of the component 10. The conductive surfaces 32, 32' are capable of transferring heat and both the conductive surfaces 32, 32' and non-conductive surfaces 30, 30' apply pressure to the component 10 when the forming tool 24 is moved to the closed position, shown in FIG. 4.

When the component 10 is in the closed position, an electric current is applied to loose ends of the conductor 22, 22' so that current flows between the two ends along the welding surface 16, 16' of the at least two portions of the component 10. At the same time, the closed forming tool 24 applies pressure to shape the top half 12 and bottom half 14, pressure is also applied to the non-conductive surfaces 30, 30' in the welding region to help facilitate the melting together and welding of the at least two portions or top half 12 and bottom half 14 of the component 10. After a certain amount of time necessary to form a weld, the electric current is disconnected from the conductor 22, 22' and the forming tool is opened so that the finished component can be removed. The conductive surfaces 32, 32' of the forming tool 24 are any type of metal capable of heat transfer and can include aluminum, steel, iron, etc. However, it is within the scope of this invention for any suitable conductive materials to be used. The non-conductive surfaces 30, 30' are formed of non-conductive material such as nylon or any other suitable non-conductive material. However, it is within the scope of this invention for any suitable non-conductive materials to be used.

Figure 8:
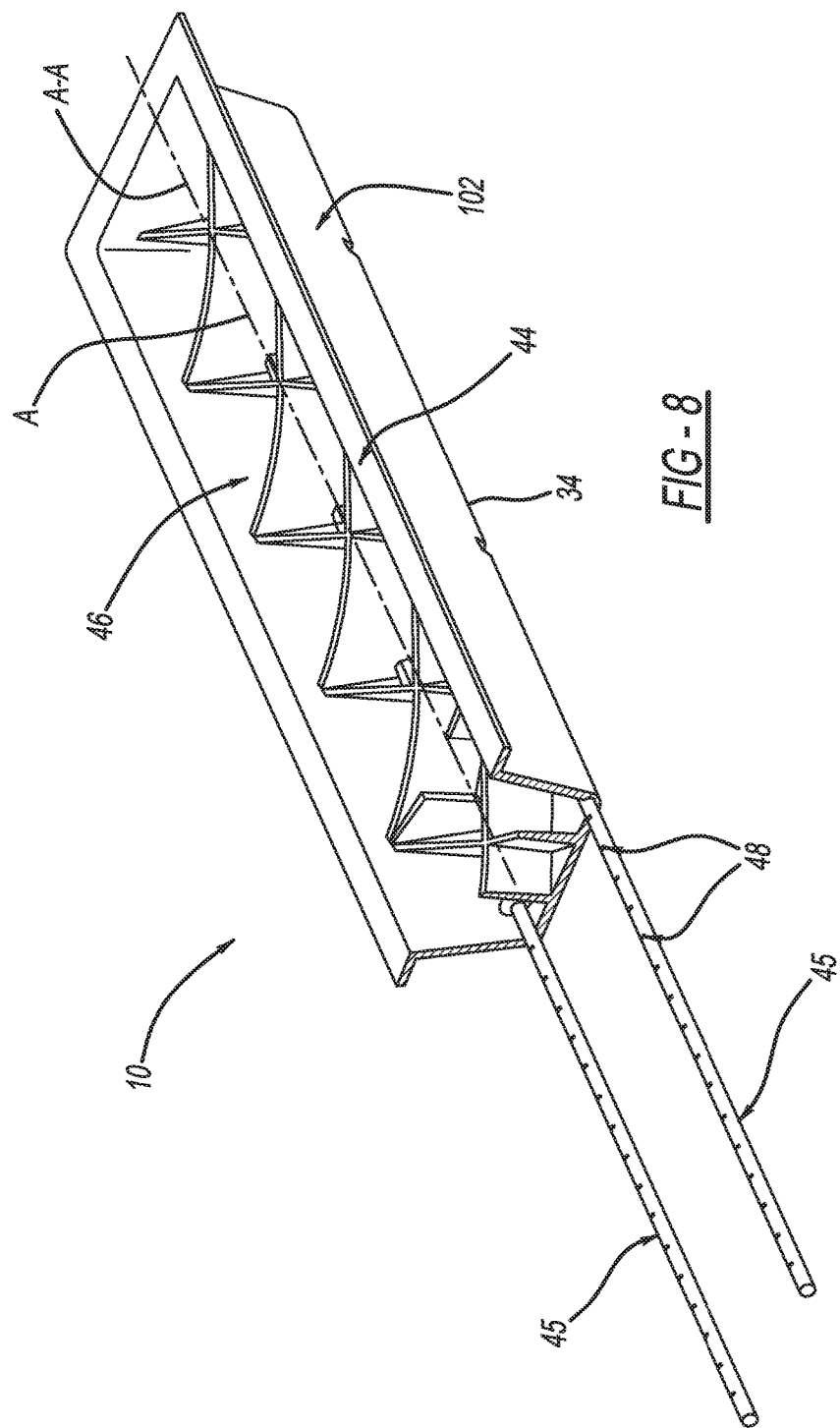
FIG. 8, the embodiment of FIG. 6 in a cut-open representation with reinforcing filaments exposed.

Referring now to FIGS. 6-8 the details of the component 10 are shown. The component 10 has an elongated dish-like basic element formed a synthetic material that consists of thermoplastic composite materials, and particular glass-, carbon- or aramide fiber-reinforced thermoplastics, preferably polypropylene, polyamide and polycarbonate. The component 10 has two portions 12, 14 each having a substantially U-shaped structure that is limited by a floor surface 34, 2 elongated side surfaces 36, 38 and two end-side surfaces 40, 42 extending transversely. The two elongated side surfaces 36, 38 and two elongated and-side surfaces 40, 42 are bent over outward at right angles at the upper side edges and form a peripheral edges 44. The edges 44 provide or create the welding surface of each of the two portions 12, 14 during resistive implant welding processes described above. The conductor 22, 22' is placed between two opposing edges 44 on a respective one of the two portions 12, 14. This is shown in FIG. 1. When the two portions 12, 14 are resistive implant welding to join together the two portions 12, 14 together the component 10 forms a closed box like structure.

Each of the two portions 12, 14 have reinforcing ribs 46 formed of the same material as the two portions 12, 14. The reinforcing ribs 46 are arranged at an angle between 30° and 60°, preferably 45° with respect of the two elongated side surfaces 36, 38. In the embodiment illustrated in the drawing, the reinforcing rib 46 starting from the two elongated side surfaces 36, 38 run at an angle of about 45°. As shown, the reinforcing ribs 46 are arranged in a way that they will form a diamond-shaped grid in the interior of the component 10. This increases the stability of the component 10 and reinforcing filaments 45 running in the longitudinal direction A, embedded in the edge regions of the floor surface 11. The reinforcing filaments 45 are designed as metal wires, which have formations 48 in their surface. The formations 48 may be holes, grooves or the like, arranged regularly spaced apart. The reinforcing filaments 45 are made of metal, and particular steel, and have a coating for prevention of corrosion. The reinforcing filaments 45 have a diameter of 3-4 mm. In an additional embodiment, the reinforcing filaments 45 are made of organo-plates, metal strips, shaped metal parts or wire mesh.

During formation of the component 10 the reinforcing filaments 45 are insulated from electrical current migrating through the forming tool 24 as a result of the non-conductive metal surface areas 30, 30' or regions of the forming tool 24.

Referring now to FIGS. 9-13 a method for forming a component 100 that is a welded tailgate 100 is shown. The component 100 is shown in a forming tool 102, which is similar to the forming tool 24 shown in the other embodiments in that it also has conductive surfaces and nonconductive metal surfaces. The forming tool 102 has an upper platen 114 capable of moving vertically with respect to the component 100. The forming tool 102 also has a lower platen 116 upon which the component 100 rests. When the structural component 100 is to be welded the upper platen 114 will move vertically and press down against the component 100 and apply pressure. While the present exemplary embodiment of the invention describes the use of an upper platen 114 and lower platen 116, it is possible to reduce the number of fixtures required for forming the component 100 by eliminating the upper platen 114 and lower platen 116 and using simple clamps for applying pressure on the component during the welding process. This allows for the forming tool 102 to be used for several different applications and not specifically for a particular component.

Figure 10:
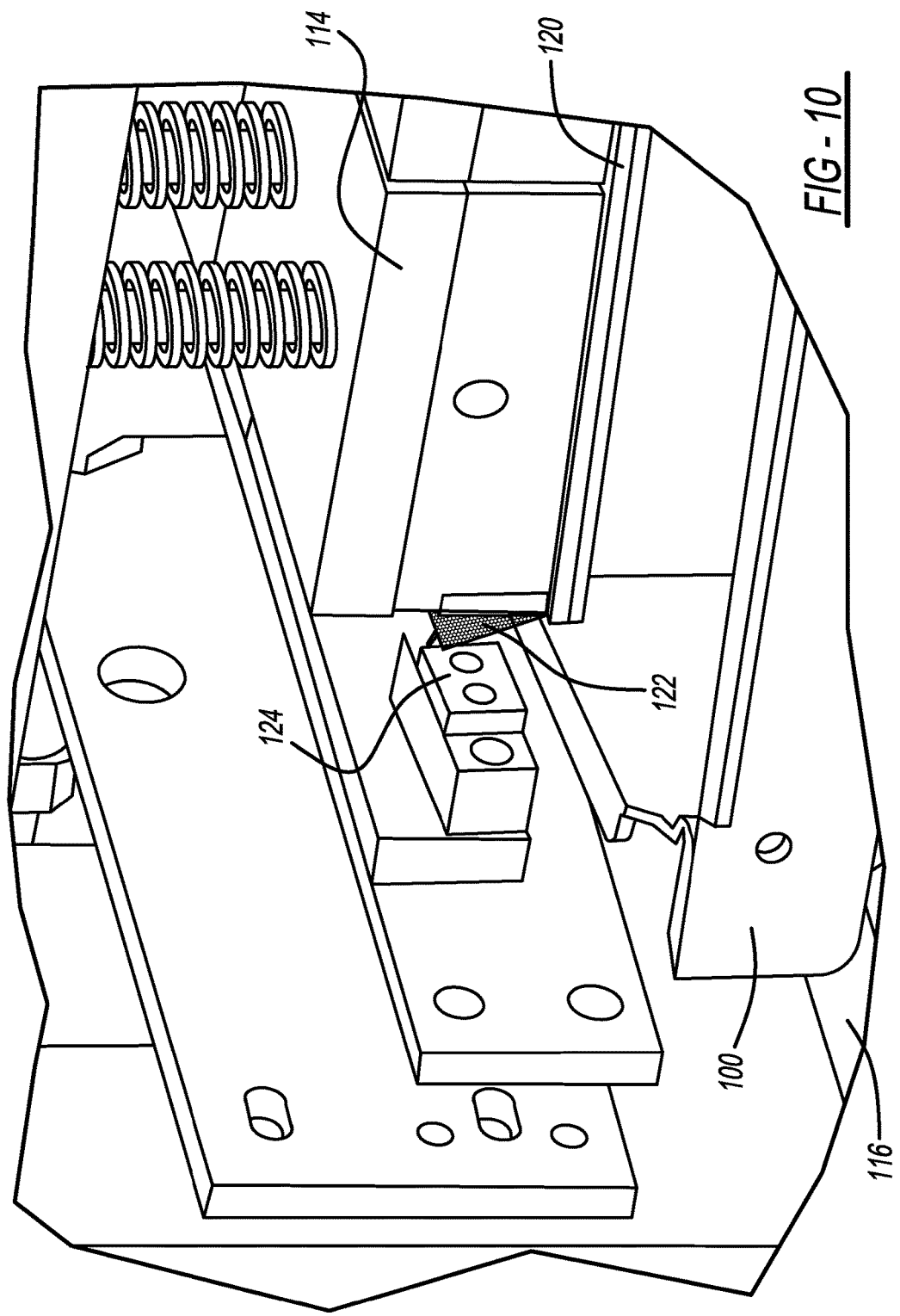
FIG. 10 is a perspective close up view of tailgate component being formed in the forming tool.

FIG. 10 shows a close up view wherein the upper platen 104 is pressed down against the component 100. The component 100 has a first portion 118, a second portion 120 and a conductor 122 placed between the first portion 118 and the second portion 120. The first portion 118 and second portion 120 can take many shapes and forms depending upon the particular application of the invention.

The conductor 122 comes into contact with an energy source 124 which can be copper contacts or conductors that energize the conductor 122. The conductor 122 can be wire mesh or some other type of electrically conductive material capable of generating heat when an electrical current is applied. While the conductor 122 is described as being wire mesh, it is within the scope of this invention for the conductor 122 to be a single wire capable of conducting energy in the form of heat. Suitable wire materials include, but are not limited to, metals including copper, aluminum, steel, nickel and other conductive materials such as carbon fiber.

Figure 12:
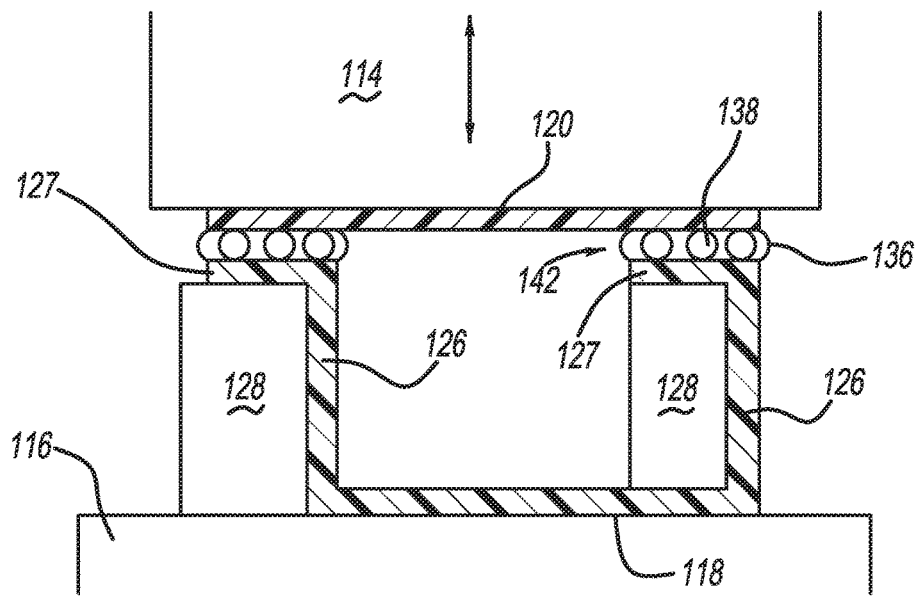
FIG. 12 is a cross-sectional view of a first portion being welded to a second portion.
Figure 13:
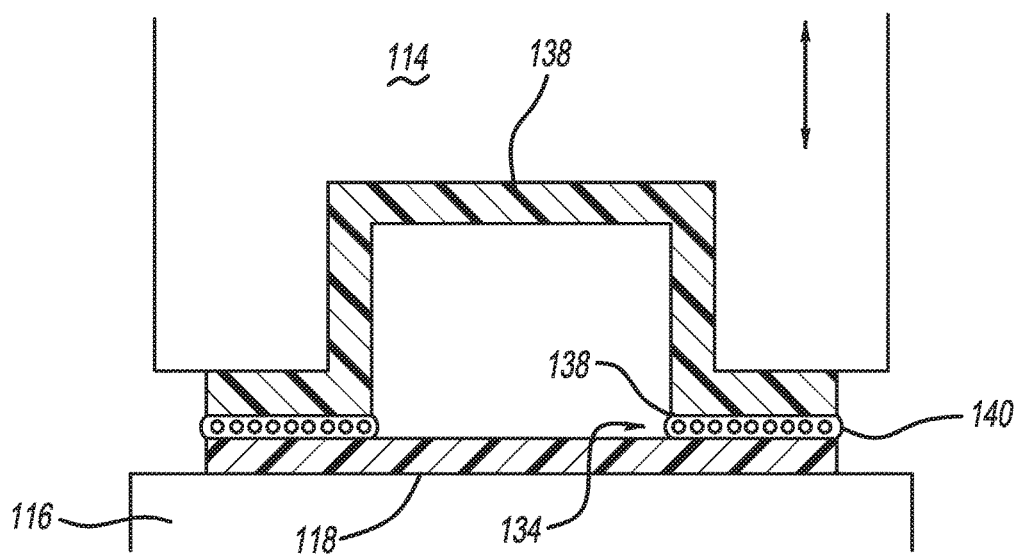
FIG. 13 is a plan side view of a first portion being welded to a second portion.

Referring to FIGS. 12-13, the method of forming a welded joint in a structural component is described. The term welded joint as used herein describes the overall connection between the two portions of the structural component. Encompassed within the welded joint is a weld line, which is the location of the physical connection between the two portions, which includes the solidified adhesive layer as well as any fused together thermoplastic materials that may melt together within the area of the weld line, in instances where one or both portions are plastic materials that melt in an area that contacts the conductor. The term welded joint also is inclusive of the area of the portions at the point of the weld, the conductor and any adhesive layer, which is optional depending on the needs of a particular application. The weld line includes the area that solidifies upon curing of the component. This can include, but is not limited to, the curing of the adhesive layer (if present) as well as any melted plastic components that are fused together.

The upper platen 114 moves down and compresses causing the first portion 118 to apply force to the second portion 120. The energy source 124 applies energy to the conductor 122 which causes the conductor 122 to heat up. FIGS. 12-13 shown an optional adhesive layer 136 is positioned between the first portion 118 and second portion 120. The adhesive layer 136 can be applied to a surface on either the first portion 118 or second portion 120. Additionally, it is possible for adhesive to be applied on both the first portion 118 and the second portion 120. The conductor 122 is placed through the adhesive layer 134 and begins to heat up when energy is applied to the conductor 122 by the energy source 124. The conductor 122 can be placed through the adhesive layer 136 prior to the adhesive layer 136 being applied to the first portion 118 or second portion 120. Additionally, it is possible for the conductor to be placed on either the first portion 118 or second portion 120 and then the adhesive layer 136 is applied over the conductor 122 so that when the upper platen 114 applies pressure, the conductor 122 will be pressed into the adhesive layer 136. In other applications, the adhesive layer 136 and conductor may remain separate and the conductor 122 will apply heat across the adhesive layer 136. The heating of the conductor 122 causes a welded joint 140 to be formed at a weld line 142 by activating the adhesive layer 136 to bond the first portion 118 and second portion 120 together at the weld line 142 to create a welded joint of the component 100. The pressure applied by the platens 114, 116 exerts force on the first portion 118 and second portion 120 causes the adhesive to flow around the conductor 122 and bond the first portion 118, second portion 120 and the conductor 122 together at the weld line 142.

After the pressing and energizing operation has occurred for a predetermined time period the first portion 118 and second portion 120 will be allowed to cure and form the weld line 142. The conductor 122 will remain in the structural component 100 at the weld line; however, it is possible for the conductor 122 to be removed from the adhesive layer 136 prior to complete curing of the welded joint 140. The weld line 142 formed between the first portion 118 and second portion 120 will have a high weld strength, that has been shown to be equal or greater than the type of weld strength obtained using adhesives or mechanical fasteners. Furthermore, the manufacturing time for forming the weld between the first portion 118 and second portion 120 is much shorter than the manufacturing time forming a similar weld using traditional adhesive systems. Additionally, use of the RIW technique and the adhesive system allows for a more thorough heating of the adhesive layer and provides an energy savings between about 10% to about 70% over conventional adhesive systems because the heat is being applied from within the adhesive layer via the conductor 122. Furthermore, traditional adhesive systems use steam, which needs to be stored and kept at a sufficient temperature before application. The present invention lowers the amount of energy needed by eliminating the need to maintain heat (e.g. steam) within the system.

Figure 11:
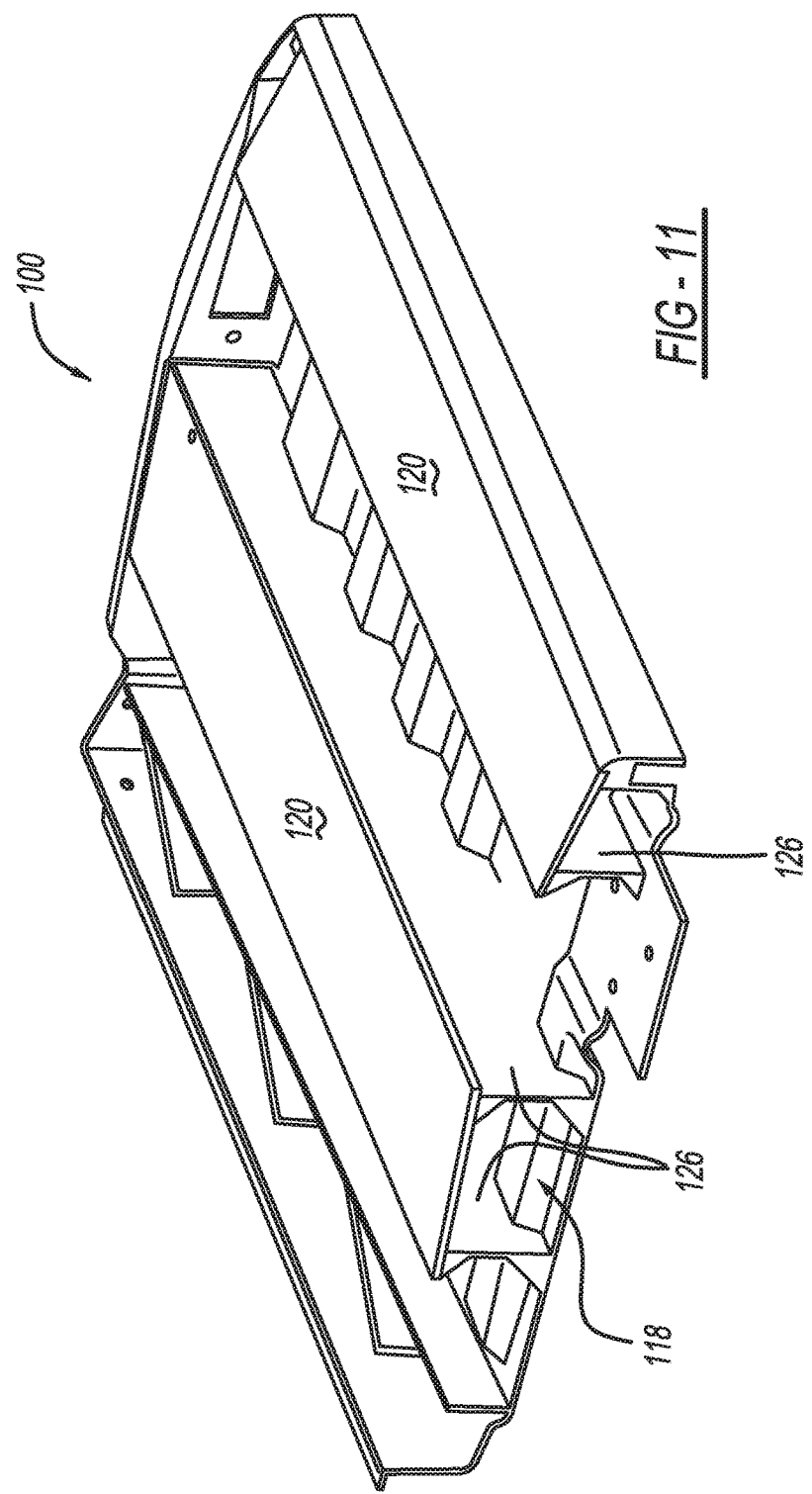
FIG. 11 is a perspective view of one half of a vehicle tailgate.

Referring to FIG. 11 a view of the moulded tailgate 100 is shown wherein the first portion 118 is the moulded tailgate portion and the second portion 120 is a reinforcement sheet that strengthens the structural component 100. The first portion 118 has tailgate flanges 126 extending from the first portion 118. The second portion 120 or reinforcement sheet is placed across one or more of the tailgate flanges 126. The conductor (not shown) is placed along the contact area between the tailgate flanges 126 and the second portion 120. The weld line 142 is formed along the length of the surface area of the conductor 122. The placement of the reinforcement sheet strengthens the structural component. For example, a tailgate as moulded in a manner described with respect to the present application can withstand loads greater or less than 2,200 lbs. However, 2,200 lbs. is merely exemplary number and depending on the specification the load can be greater or lesser.

Referring now to FIG. 12 a cross-sectional view of a portion of the tailgate shown in FIG. 11 is shown. The first portion 118 is a moulded tailgate portion having tailgate flanges 126 extending upward from the surface. The second portion 120 is welded onto the first portion 118. The upper platen 114 is shown and applies pressure toward the lower platen 116 during the welding process. In this particular application rigid supports 128 are inserted under L-shaped weld portions 127 of the tailgate flanges 126 in order to facilitate and even the weld of the first portion 118 to the second portion 120. The rigid supports 128 can be removed after the welding process is complete or left as solid supports. Alternatively, a welded joint can be created between the rigid support 128 and the L-shaped weld portions 127 in instances where these supports 128 are to remain. This weld would be in addition to the weld between the first portion 118 and the second portion 120. Disposed on the surface of the L-shaped weld portion 127 is a first adhesive layer 134. A second adhesive layer 136 is attached to the corresponding surface of the second portion 120 where the weld is to be formed. A conductor 138 is placed between the first adhesive layer 134 and second adhesive layer 136 and when heated will cause a weld line 142 to be formed between the first portion 118 and second portion 120. This is accomplished by heating the conductor 138 to cause the adhesive layers 134, 136 to heat up and activate. Additionally, the adhesive layers 134 and 136 can be smaller so that the conductor 138 actually contacts the surface of the L-shaped weld portion 127 and second portion 120 so that the surface layers of these portions will melt together with the adhesive layers forming a weld line 142 that is created by the hybrid resistive implant welding process, using the conductor 138 as well as adhesive bonding by the adhesive layers 134, 136.

The amount of energy needed to form the weld line 142 is less than traditional RIW welding without adhesive layers because the adhesive layers 134, 136 can be activated with heat produced by the conductors 138 in order to form the weld line 142. The conductor 138 applies a more direct form of energy than traditional heating. Although the use of rigid supports 128 is described above, it is not necessary to use them in all applications. It is possible to form a weld without the use of rigid supports 128.

FIG. 13 shows an alternate embodiment of the invention wherein there are no tailgate flanges 126; instead a u-shaped second portion 132 is welded onto the first portion 118 which is a moulded tailgate. This particular embodiment eliminates the need for using rigid supports 128. The upper platen 114 is modified to fit around the u-shaped second portion 132 and apply pressure at the appropriate location where a weld line 134 between the first portion 118 and the u-shaped second portion 132 is desired. In this particular embodiment, an adhesive layer 140 is applied to either the first portion 118 or second portion 132. The conductor 138 is heated to activate adhesive layer 140 to cause a weld to be formed. Additionally, it is possible for the conductor 138 to contact the surface area of the first portion 118 and the second portion 132 in order to generate enough heat to melt a surface layer of each of these components to cause the weld line 134 to be created by the fusing together of the first portion 118 and the second portion 132 in addition to adhesively welded together by the adhesive layer 140. The method of creating the weld line 134 in FIG. 13 provides the same benefits and advantages as described above with respect to FIG. 12.

Referring now to FIGS. 14-19 is an embodiment where the component formed using resistive implant welding is a composite bumper arrangement, hereafter referred to as a bumper 200 made from carbon fiber thermoplastic composites. The bumper 200 includes a mounting plate portion or mounting plate 212 and a bumper portion 214. Also included are two decorative covers 216 which are connected to the bumper portion 214.

Optionally included is a trailer hitch 218, which is also connected to the mounting plate 212. There is a hitch connecting flange 220 formed as part of the mounting plate 212 which are in alignment with a trailer hitch mounting flange 222 formed as part of the trailer hitch 218 when the trailer hitch 218 and mounting plate 212 are assembled, and a set of fasteners (not shown) are inserted though the hitch connection flange 220 and hitch mounting flange 222 to connect the trailer hitch 218 to the mounting plate 212.

Figure 9:
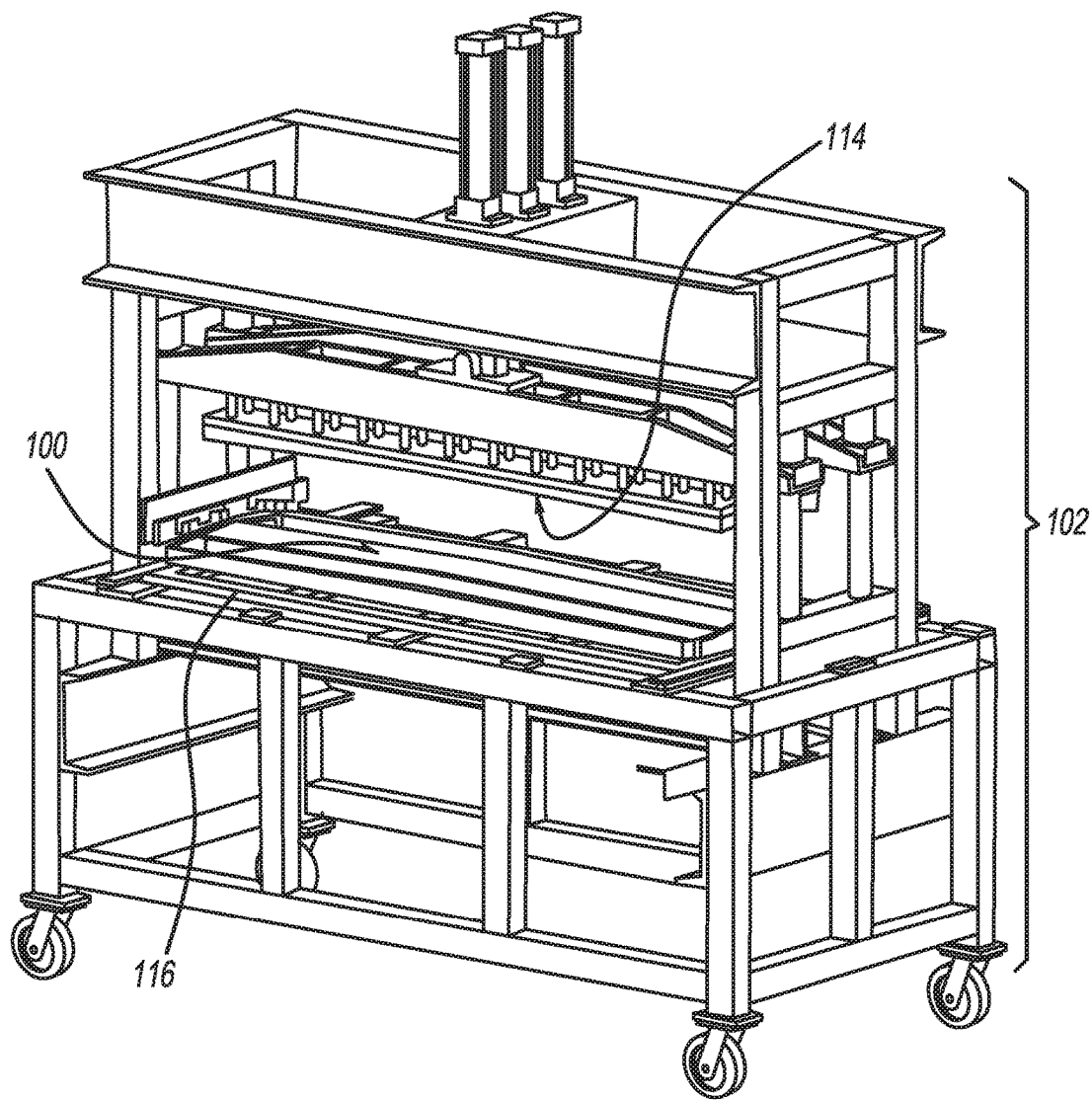
FIG. 9 is a perspective view of the forming tool used to resistive implant weld a carbon fiber thermoplastic component according to a second embodiment of the invention.

Formed as part of the bumper portion 214 is a plurality of flanges 224. More particularly, there is a plurality of upturn flanges and downturn flanges formed on the inside of the bumper portion 214, where the upturn flanges and downturn flanges are substantially parallel to each other. One of the flanges 224 is shown in FIG. 9.

To assemble the bumper portion 214 to the mounting plate 212, a mesh 226 is placed in between a first contact area 228 of the mounting plate 212 and a second contact area 230 of the flange 224. The bumper portion 214, mounting plate 212 and mesh 226 are loaded into the forming tool 24 and a weld line is created in the same manner as described with reference to FIGS. 1-5 above. The features of the forming tool 24 as described above prevent electrical current from migrating through the bumper portion 214 and mounting plate 212. The mesh 226 is a copper or aluminum wire mesh 226. A current is applied to the mesh 226, increasing the temperature of the mesh 226, thereby increasing the temperatures of the contact areas 228, 230, causing the contact areas 228,230 to melt. As the mesh 26 is heated, pressure is applied to the bumper portion 214 and mounting plate 212 using the forming tool 24. The pressure applied to the bumper portion 214 and mounting plate 212 combined with the melting of the contact areas 228,230 causes material of the first contact area 228 and material of the second contact area 230 to flow through the mesh 226, and mold together. Once the current is no longer applied to the mesh 226, the material of the flange 224 and the material of the mounting plate 212 cools, and the bumper portion 214 and mounting plate 212 are molded together in the area of the contact areas 228, 230 to provide a connection point, this provides a strong bond between the mounting plate 212 and bumper portion 214.

The mounting plate 212 and bumper portion 214 are made of a long carbon fiber material, with the carbon fibers being about twelve millimeters in length, but it is within the scope of the invention that carbon fibers of other lengths may be used as well. The long carbon fiber material used for making the mounting plate 212 and bumper portion 214 is a propylene material, but it is within the scope of the invention that other materials, such as nylon, may be used.

In addition to the flanges 224 being formed as part of the bumper portion 214 as previously described, other types of flanges in different embodiments are used to provide the connection between the mounting plate 212 and the bumper portion 214. For example, flanges may be formed as part of the mounting plate 212 and received into the bumper portion 214, and the bumper portion 214 may be compressed to form a connection using the resistive implant welding process described above. Other flanges in different configurations may be used as well, depending upon how the bumper portion 214 and mounting plate 212 are to be connected.

Figure 14:
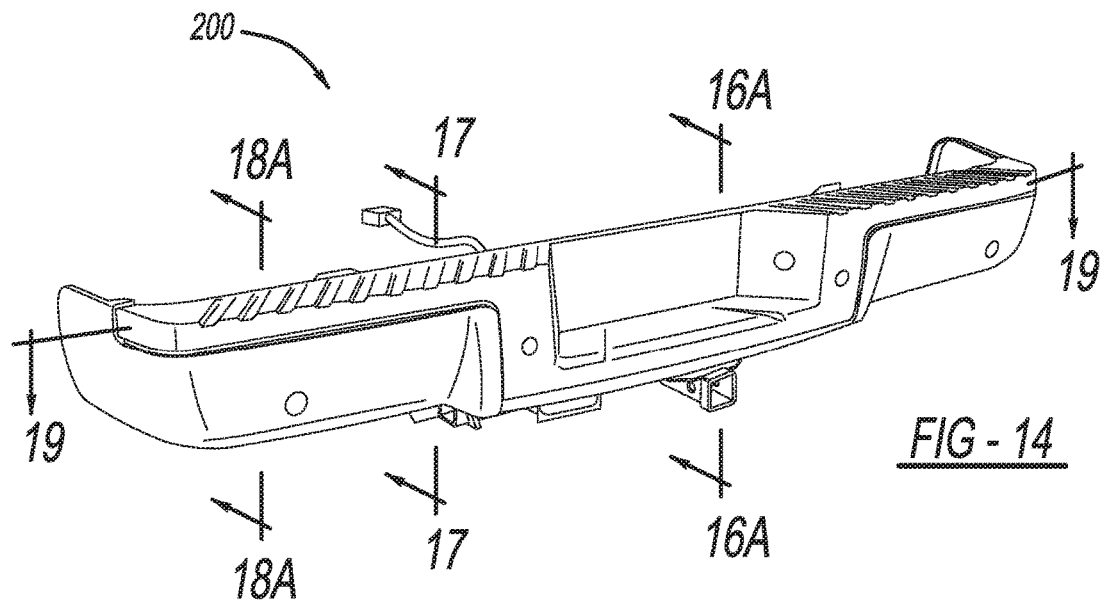
FIG. 14 is a perspective view of an alternate embodiment of the component, which is a bumper assembled using a resistive implant welding process, according to the present invention.
Figure 15:
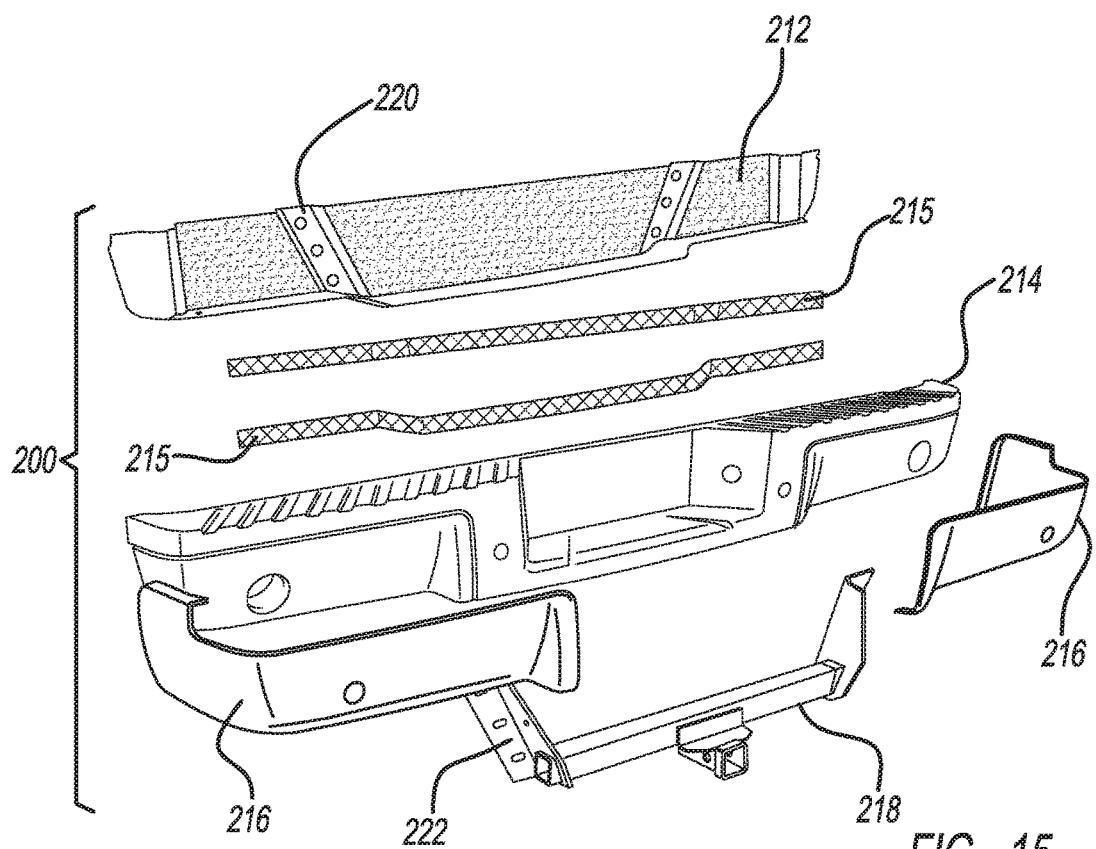
FIG. 15 is an expanded view of a bumper assembled using a resistive implant welding process, according to the present invention.
Figure 16:
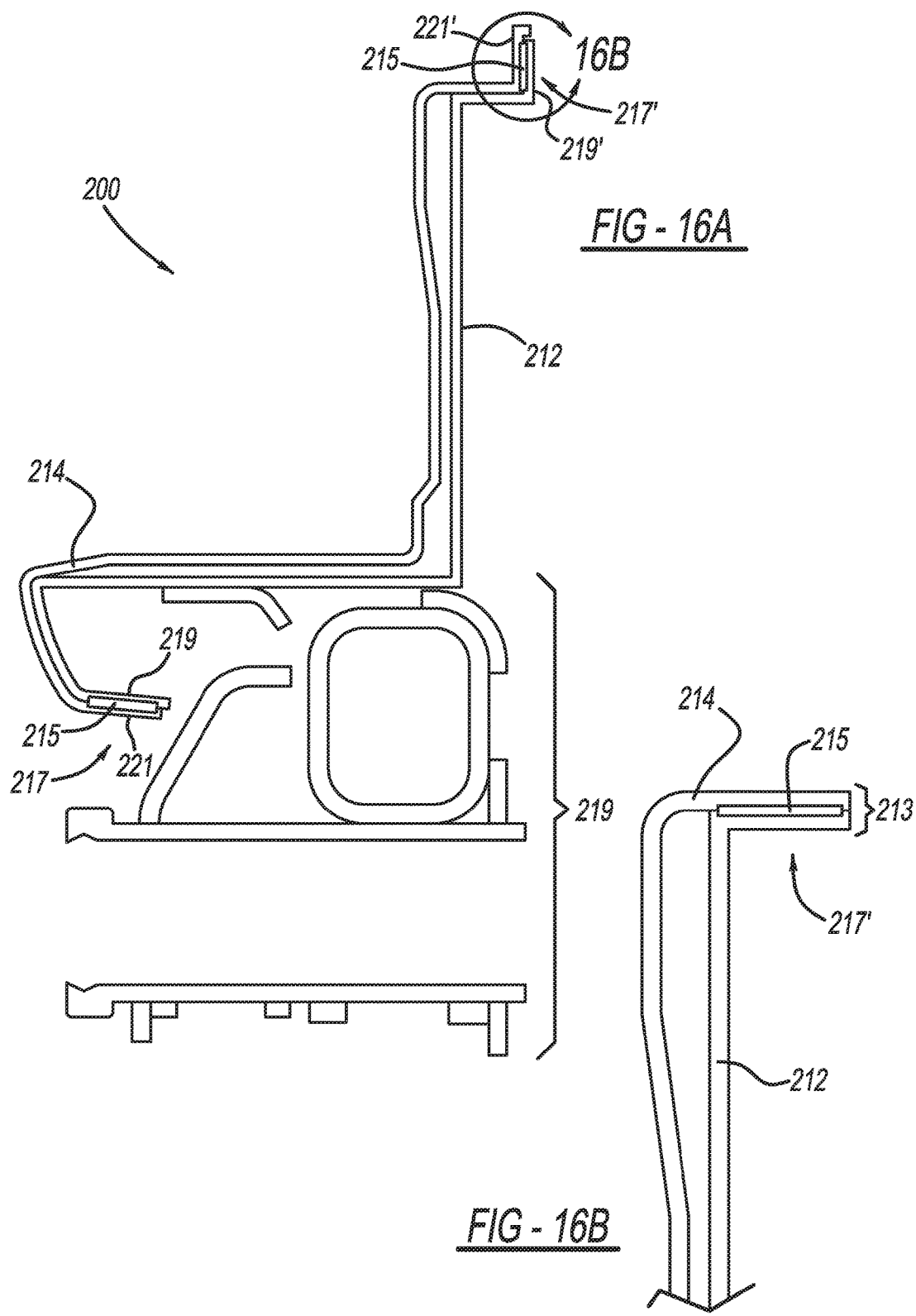
FIG. 16A is a sectional view taken along line 16A-16A of FIG. 14.
FIG. 16B is an enlarged sectional view of an alternate connection point in accordance with the present invention.

Referring now to FIGS. 16A, 16B, 17, 18A and 18B, various cross-sectional views of the composite bumper arrangement 10 are shown with the sections being taken along the section lines shown in FIG. 14. The sectional views shown in FIGS. 16A, 16B, 17, 18A and 18B illustrate how the composite bumper arrangement 200 is bonded together at various connection points using resistive implant welding. These drawings also show how the structure of the composite bumper creates strengthening features that make the composite bumper exhibit displacement values at specific forces that are less than the displacement values for a conventional steel bumper. FIG. 16A shows a cross-sectional view of the composite bumper arrangement 200 taken along section 16A-16A of FIG. 14. At this particular location, there are two connection points 217, 217' where the bumper portion 214 is connected to the mounting plate 212. Each connection point 217, 217' has a first contact area 219, 219' of the mounting plate 212 and a second contact area 221, 221' of the bumper portion where the connection point 217, 217' is created.

A mesh material 215 is positioned between the first contact area 219, 219' and the second contact area 221, 221' for the purpose of bonding the two contact areas together by resistive implant welding. Resistive implant welding can be used; however it is within the scope of this invention for other types of connections to be used such as adhesives or fasteners. Resistive implant welding involves energizing the mesh material 215 in order to generate heat between the first contact area 219, 219' and the second contact area 221, 221' in order to cause the respective surfaces of the mounting plate 212 and bumper portion 214 in the area of the connection point 217, 217' to melt and bond together. FIG. 16A also shows the location of the trailer hitch 218 relative to the mounting plate 212 and bumper portion 214.

FIG. 16B shows an alternate connection point 217 configuration where the bumper portion 214 and the mounting plate 212 have a turned flange 213 for creating connection point 217' that is horizontal instead of a connection 217' shown in FIG. 16A that is vertical. The horizontal connection point 217' is an alternate embodiment and may not be practical for every application. The alternate embodiment shown in FIG. 16B allows for the bumper portion 214 to rest on top of the mounting plate 212 in order to provide additional strength at the connection point 217'.

Figure 17:
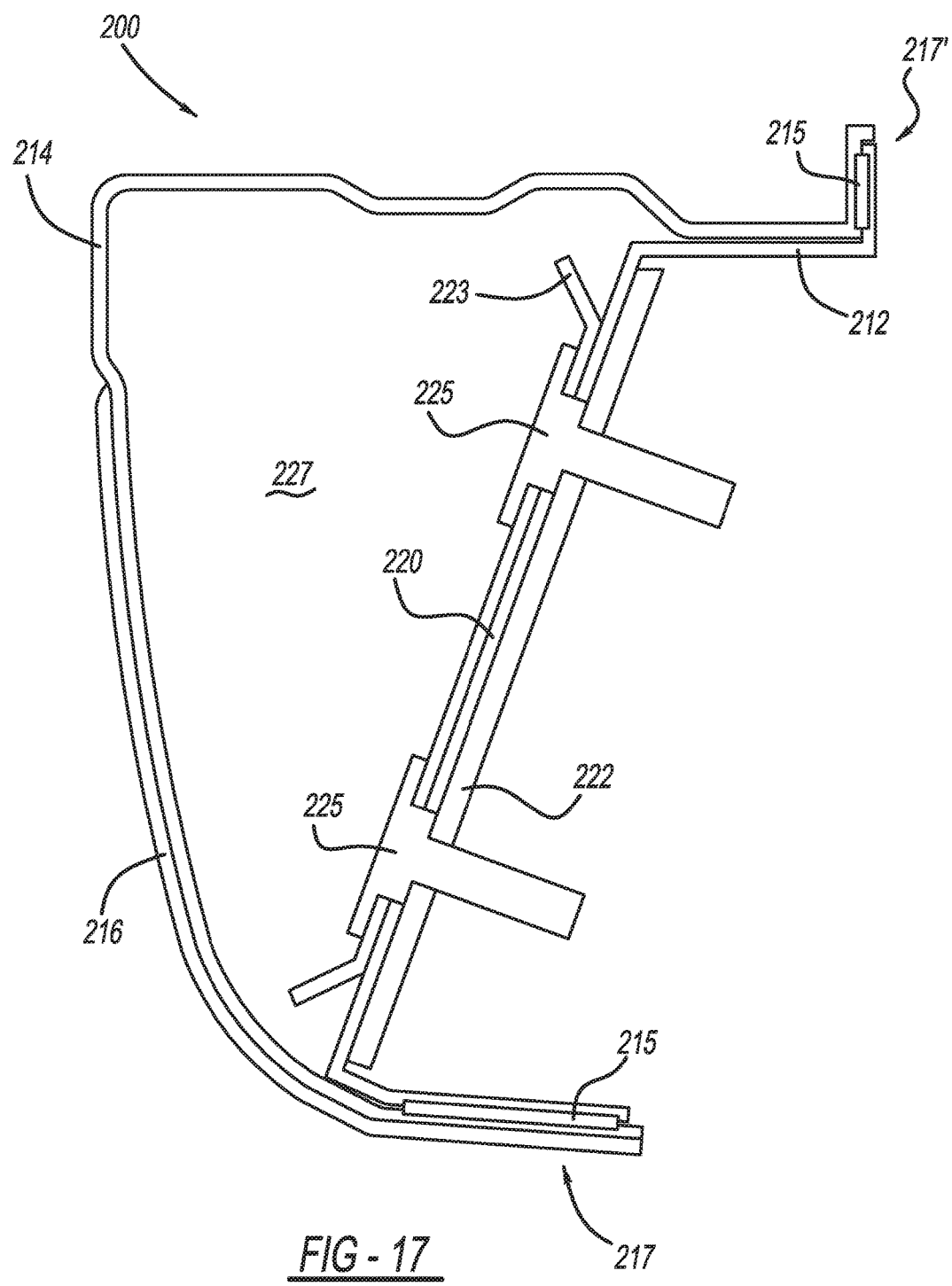
FIG. 17 is a sectional view taken along line 17-17 of FIG. 14.
Figure 18:
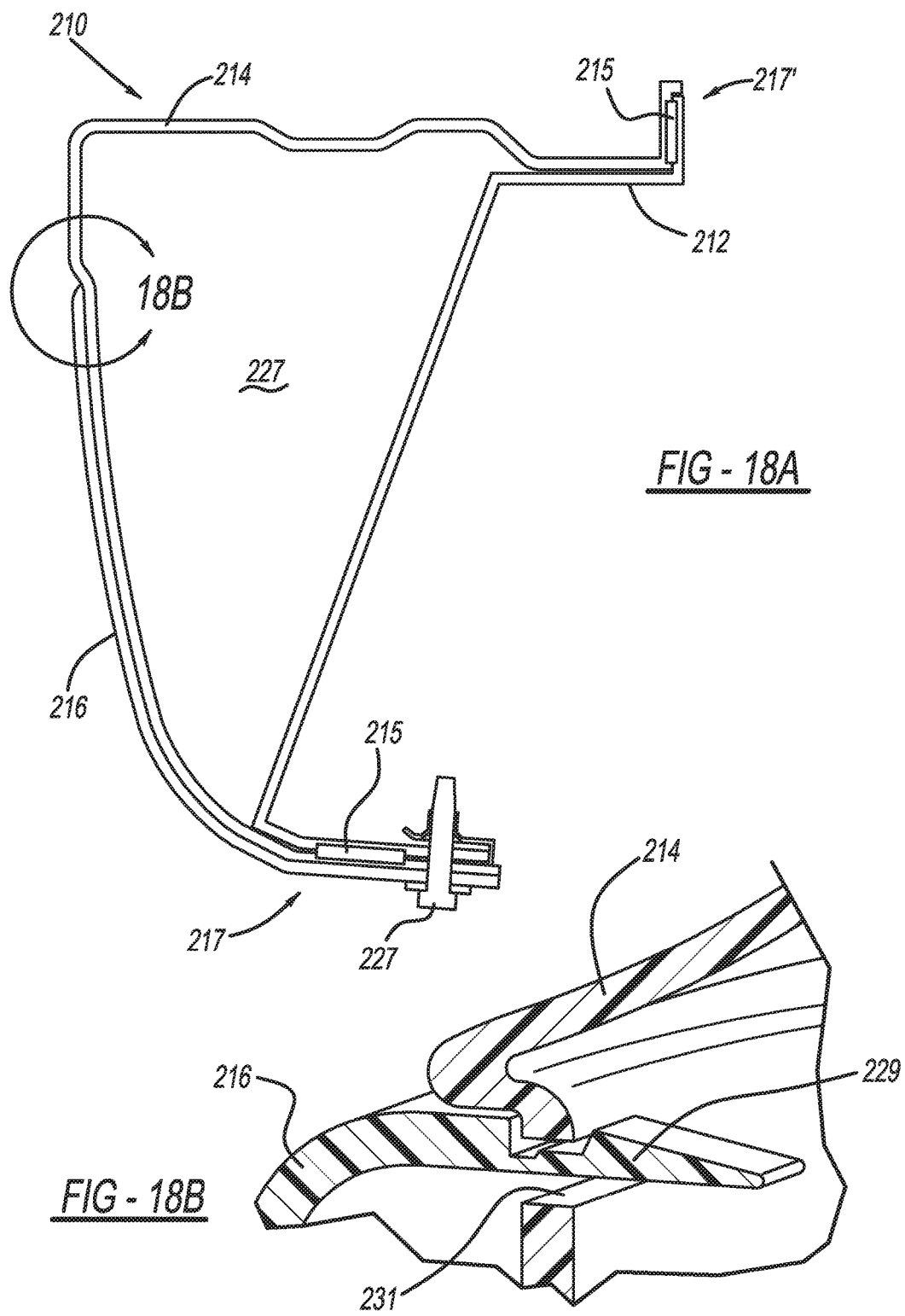
FIG. 18A is a sectional view taken along line 18A-18A FIG. 14.
FIG. 18B is an enlarged cross-sectional perspective view of a connection clip in accordance with the present invention.
Figure 19:
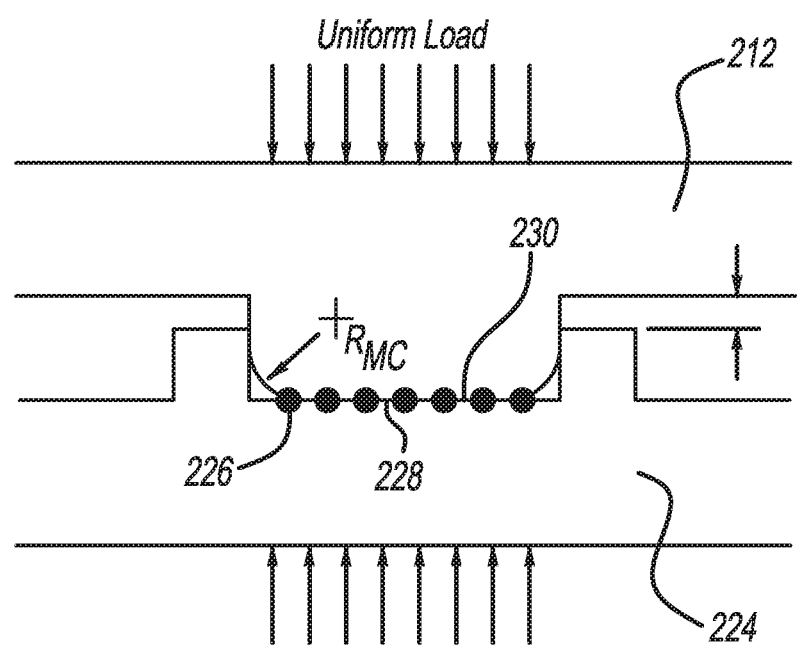
FIG. 19 is a schematic section view taken along line 19-19 in FIG. 14.

FIG. 17 shows a second sectional view taken along section lines 17-17 of FIG. 14. The connection points 217, 217' are created in the same manner as described with regard to FIG. 16A. FIG. 17 shows additional structures connected to a composite bumper arrangement 200. In particular, FIG. 17 shows where one of the decorative covers 216 is connected to the bumper portion 214. The decorative cover 216 can be connected to the bumper portion 215 either using adhesives, or in the alternative it is possible to use resistive implant welding and mesh (not shown) placed between the decorative cover 216 and bumper portion 214. Alternatively, it is possible to connect the decorative cover 216 to the bumper portion 214 using a clip or mechanical fastener.

FIG. 17 shows the location of the mounting flange 222 portion of the trailer hitch 218. The mounting flange portion 222 has apertures for receiving fasteners 225 that pass through apertures on the hitch connection flange 220 of the mounting plate 212. Also included at the connection between the hitch mounting flange 222 and hitch connecting flange 220 is a doubler plate 223 that serves to facilitate the connection of the fasteners 225 through the apertures of the hitch connecting flange 220 and trailer hitch mounting flange 222. When the bumper portion 214 is connected to the mounting plate 212, a structural cavity 227 is created. The structural cavity 227 is defined by an area between the mounting plate 212 and bumper portion 214 once the connection points 217, 217' are formed. The structural cavity 227 created by the formed composite bumper arrangement strengthens the composite bumper arrangement to the point that the composite bumper arrangement, as a whole, can resist greater forces than a conventional steel bumper.

FIG. 18A depicts a cross-section view taken along section line 18A-18A of FIG. 14. FIG. 18A shows a fastener 227 used as one alternate way of connecting the decorative cover 216 to the bumper portion 214. The fastener 227 extends through one of the decorative covers, bumper portion 214 and support plate 212 where the fastener is secured. FIG. 18B is an exploded perspective view of a portion of FIG. 18A wherein a resilient tab 229 is formed on one end of one of the decorative cover portions 216. The resilient tab 229 is disposed through an opening 231 formed in the bumper portion 214. Thus, the resilient tab 229 allows one of the covers 216 to be snap fit onto the bumper portion 214. The use of the resilient tab 229 is an alternate means of connecting the cover portion 216 that can be used in place of the fastener 227 discussed above. Addition of the cover portion 216 can be resistive implant welded onto the bumper portion 214 or it is possible for adhesives to be used.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of resistive implant welding carbon fiber thermoplastic composites comprising the steps of:
   providing at least two portions of a component formed with carbon fiber material, said at least two portions of the component each have a welding surface where said at least two portions of the component are welded together;
   providing one or more conductors of copper or aluminum mesh material positioned between the welding surface of the at least two portions;
   providing a forming tool having at least two portions capable of moving between an open position and a closed position, wherein said forming tool has a welding region with electrically non-conductive surface areas where electric current is selectively applied from an electric source to facilitate the welding together of the at least two portions of the component and the forming tool has forming regions with thermally conductive surface areas where the at least two portions of the component are shaped;
   opening the forming tool and loading the at least two portions within the forming tool with the one or more conductors positioned at the welding surface between the at least two components;

closing the forming tool and applying pressure to shape the at least two components in the forming regions of the forming tool;

applying electric current to the one or more conductors causing the conductors to heat up and melt the at least two portions of the component together along the non-conductive surface areas of the forming tool, wherein the step of applying electric current occurs during the step of closing the forming tool and pressure from the forming tool is also applied to the non-conductive surface areas of the forming tool;

disconnecting the electric current from the one or more conductors after the at least two portions have been welded together to finish the formation of the component; and opening the forming tool and removing the component.

2. The method of resistive implant welding carbon fiber thermoplastic composites of claim 1 further comprising:

wherein the component is a molded tailgate having a first one of said at least two portions is a molded tailgate portion having one or more tailgate flanges creating the welding surface extending from said first portion and a second one of the at least two portions is a reinforcement sheet placed across the one or more tailgate flanges;

wherein the one or more conductors are each positioned in a respective one of the welding surface of the one or more tailgate flanges;

wherein the welding region is created along a surface area between the one or more tailgate flanges and the reinforcement sheet.

3. The method of resistive implant welding carbon fiber thermoplastic composites of claim 1 further comprising:

wherein the component is a composite bumper and a first one of said at least two portions is a mounting plate having a first contact area and a second one of the at least two portions is a bumper portion having a second contact area;

wherein the one or more conductors are each positioned between the first contact area and the second contact area;

wherein the welding region is created along a surface area between the mounting plate and the bumper portion where the one or more conductors are positioned between the first contact area and the second contact area.

4. The method of resistive implant welding carbon fiber thermoplastic composites of claim 3 further comprising:

one or more decorative covers connected to said bumper portion wherein said each of said decorative cover members further comprise a resilient tab formed on one end of said decorative cover for being disposed through an opening formed on the bumper portion in order to provide a snap fit connection between each of said one or more decorative cover members and said bumper portion.

5. The method of resistive implant welding carbon fiber thermoplastic composites of claim 3 further comprising a trailer hitch connected to said mounting plate, a hitch connection flange formed on said trailer hitch and a hitch mounting flange formed on said mounting plate, wherein said hitch connection flange and said hitch mounting flange are aligned during assembly and are used to connect said trailer hitch to said mounting plate.

6. The method of claim 1 further comprising:

wherein the at least two portions of the component are two half open tub like synthetic material structures and the welding surface of the two sections are located at the edges of the two half open tub like synthetic material structures such that when the two half open tub like synthetic material structures are joined together they form a closed box like structure;

providing outer regions of the two half open tub like synthetic material structures that surround one or more reinforcing filaments that extend parallel to a longitudinal axis of the component, said outer regions being located in the thermally conductive surfaces of the forming tool during the step of opening the forming tool and loading the at least two portions into the forming tool; and formations on the surface of the one or more reinforcing filaments, where in the formations hold the one or more reinforcing filaments to the respective one of said two half open tub like synthetic material structures so as to absorb tensile forces and bending of the closed box like structure of the formed component, wherein said one or more reinforcing filaments are insulated from electrical current migrating through the forming tool as a result of the non-conductive surface areas of the forming tool where electric current is selectively applied.

7. The method of claim 6 wherein each of the two half open tub like synthetic material structures has one or more inner ribs.

8. The method of claim 7 wherein each one of the one or more ribs is arranged at an angle between about 30° to about 60° with respect to two elongated side surfaces of each of the two half open tub like synthetic material structures.

9. The method of claim 6 wherein each of the two half open tub like synthetic material structures has two or more inner ribs arranged in a diamond shaped pattern extending across each of the two half open tub like synthetic material structures.

10. The method of claim 6, wherein the one or more reinforcing filaments are designed as metal wires, which have a diameter of 3-4 mm.

11. The method of claim 6 wherein the at least two portions consist of thermoplastic composite materials with glass-, carbon- or aramide fiber reinforcements.

12. The method of claim 6 wherein the reinforcing filaments are located in a region of floor surfaces of each of the two half open tub like synthetic material structures.

13. The method of claim 1 wherein the electrically nonconductive surface areas of the forming tool is formed of nylon.

14. The method of claim 1 where in the thermally conductive surface areas of the forming tool is one selected from the group consisting of aluminum, steel, iron or combinations thereof.

15. A method of resistive implant welding carbon fiber thermoplastic composites comprising the steps of:

providing at least two portions of a component formed of carbon fiber that are two half open tub like synthetic material structures and the welding surface of the two sections are located at the edges of the two half open tub like synthetic material structures such that when the two half open tub like synthetic material structures are joined together they form a closed box like structure, wherein outer regions of the two half open tub like synthetic material structures surround one or more reinforcing filaments that extend parallel to a longitudinal axis of the component and the one or more reinforcing filaments include formations on the surface of the one or more reinforcing filaments that hold the one or more reinforcing filaments to the respective one of said two half open tub like synthetic material structures so as to absorb tensile forces and bending of the closed box like structure of the formed component, providing one or more conductors of copper or aluminum mesh material positioned between the welding surface of the at least two portions;

providing a forming tool having at least two portions capable of moving between an open position and a closed position, wherein said forming tool has a welding region with electrically non-conductive surface areas where electric current is selectively applied from an electric source to facilitate the welding together of the at least two portions of the component and the forming tool has forming regions with thermally conductive surfaces where the at least two portions of the component are shaped;

opening the forming tool and loading the at least two portions within the forming tool with the one or more conductors positioned at the welding surface between the at least two components wherein said outer regions of the two half open tub like synthetic material structures are located in the thermally conductive surfaces of the forming tool during the step of opening the forming tool and loading the at least two portions into the forming tool;

closing the forming tool and applying pressure to shape the at least two components in the forming regions of the forming tool;

applying electric current to the one or more conductors causing the conductors to heat up and melt the at least two portions of the component together along the non-conductive surface areas of the forming tool, wherein the step of applying electric current occurs during the step of closing the forming tool and pressure from the forming tool is also applied to the non-conductive surface areas of the forming tool, wherein said one or more reinforcing filaments are insulated from electrical current migrating through the forming tool as a result of the non-conductive surface areas of the forming tool where electric current is selectively applied;

disconnecting the electric current from the one or more conductors after the at least two portions have been welded together to finish the formation of the component; and opening the forming tool and removing the component.

16. The method of claim 15 wherein each of the two half open tub like synthetic material structures has one or more inner ribs.

17. The method of claim 15, wherein the one or more reinforcing filaments are designed as metal wires, which have a diameter of 3-4 mm.

18. The method of claim 15 wherein the at least two portions consist of thermoplastic composite materials with glass-, carbon- or aramide fiber reinforcements.

19. The method of claim 15 wherein the reinforcing filaments are located in a region of floor surfaces of each of the two half open tub like synthetic material structures.

20. The method of claim 15 wherein the electrically nonconductive surface areas of the forming tool is formed of nylon and the thermally conductive surface areas of the forming tool is one selected from the group consisting of aluminum, steel, iron or combinations thereof.

\* \* \* \* \*